United States Patent
Mills et al.

(10) Patent No.: US 11,403,211 B2
(45) Date of Patent: Aug. 2, 2022

(54) STORAGE SYSTEM WITH FILE PRIORITY MECHANISM AND METHOD OF OPERATION THEREOF

(71) Applicant: Enmotus, Inc., Aliso Viejo, CA (US)

(72) Inventors: Andrew Mills, Coto de Caza, CA (US); Marshall Lee, Newport Coast, CA (US)

(73) Assignee: Enmotus, Inc., Newport Beach, CA (US)

( * ) Notice: Subject to any disclaimer, the term of this patent is extended or adjusted under 35 U.S.C. 154(b) by 118 days.

(21) Appl. No.: 16/778,556

(22) Filed: Jan. 31, 2020

(65) Prior Publication Data
US 2021/0240605 A1 Aug. 5, 2021

(51) Int. Cl.
*G06F 12/00* (2006.01)
*G06F 12/06* (2006.01)
*G06F 12/02* (2006.01)
*G06N 20/00* (2019.01)

(52) U.S. Cl.
CPC ......... *G06F 12/0223* (2013.01); *G06N 20/00* (2019.01); *G06F 2212/7202* (2013.01)

(58) Field of Classification Search
CPC ........ G06F 12/0223; G06F 2212/7202; G06N 20/00
See application file for complete search history.

(56) References Cited

U.S. PATENT DOCUMENTS

| | | | |
|---|---|---|---|
| 2004/0073768 A1* | 4/2004 | Bottemiller | G06F 12/123 711/207 |
| 2009/0221359 A1* | 9/2009 | Adiraju | G07F 17/32 463/25 |
| 2010/0332725 A1* | 12/2010 | Post | G06F 3/048 711/103 |
| 2010/0332730 A1* | 12/2010 | Royer, Jr. | G06F 12/0246 711/103 |
| 2013/0227220 A1* | 8/2013 | Xi | G06F 3/0665 711/133 |
| 2015/0113223 A1* | 4/2015 | Brown | G06F 12/0238 711/133 |
| 2017/0070574 A1* | 3/2017 | Sawada | G06F 15/167 |
| 2018/0089081 A1* | 3/2018 | Ramalingam | G06F 11/079 |
| 2020/0151939 A1* | 5/2020 | Mah | A63F 13/352 |
| 2020/0250163 A1* | 8/2020 | Kuimelis | G06F 16/2255 |
| 2020/0257628 A1* | 8/2020 | Fang | G06F 9/442 |
| 2021/0247930 A1* | 8/2021 | Gupta | G06F 12/0893 |

\* cited by examiner

*Primary Examiner* — Shawn X Gu
*Assistant Examiner* — Mohammad S Hasan
(74) *Attorney, Agent, or Firm* — Perspectives Law Group, Corp.

(57) ABSTRACT

A method of operation of a storage system includes: establishing a virtual storage device 1 including allocating portions of a storage media 1, a storage media 2, a storage media N, or a combination thereof including writing data blocks to the virtual storage device 1; determining a pinning status for the data blocks; pinning the data blocks to a logical block address (LBA) range until the pinning status indicates an unpinning of the data blocks; and relocating the data blocks to the storage media 1, the storage media 2, the storage media N, or the combination thereof within the virtual storage device 1 when the pinning status indicates unpinned.

18 Claims, 5 Drawing Sheets

STORAGE SYSTEM WITH FILE PRIORITY MECHANISM AND METHOD OF OPERATION THEREOF

TECHNICAL FIELD

An embodiment of the present invention relates generally to a storage system, and more particularly to a storage system in a multi-threaded environment.

BACKGROUND

Storage architectures that can include support for a plurality of host computers are often stored in a single storage array. The storage array provides redundancy to the host computers, by a plurality of magnetic disk or semiconductor storage devices in a system, thereby increasing reliability and providing a necessary storage as a logical volume to the plurality of host computers. One of the merits of using this storage array is availability of the logical volume.

Unfortunately, modern computer operating systems are often complex multi-threaded systems that have made storage virtualization at the block level very difficult as it is often hard to tie specific operating system or application activities to a specific addressable block range. Furthermore, using file level operations in such environments to support accessing data to specific storage data elements from files or operating system working files with the goal to guarantee a specific level of performance impacts overall system performance negatively, often making it a negative experience instead of a positive one. Moreover, in order to enhance the utilization of a storage array, it can be necessary to provide logical volumes to a plurality of users in a single logical volume, which can disperse critical files among the storage devices.

Thus, a need still remains for a storage system with file priority mechanism to improve performance, accessibility, and reliability of user data. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a storage system including: establishing a virtual storage device 1 including allocating portions of a storage media 1, a storage media 2, a storage media N, or a combination thereof; writing data blocks to the virtual storage device 1 including establishing a pinning status for the data blocks; pinning the data blocks to a logical block address (LBA) range until the pinning status indicates an unpinning of the data blocks; and relocating the data blocks, by a tiering data movement engine, to the storage media 1, the storage media 2, the storage media N, or the combination thereof within the virtual storage device 1 when the pinning status indicates unpinned.

An embodiment of the present invention provides a storage system including: a virtual storage device 1 including allocating portions of a storage media 1, a storage media 2, a storage media N, or a combination thereof; a storage device interface, coupled to the virtual storage device 1, configured to write data blocks to the virtual storage device 1 including establishing a pinning status for the data blocks; a block pinning engine, coupled to the storage device interface, configured to update the pinning status and pin the data blocks to a logical block address (LBA) range until the pinning status indicates an unpinning of the data blocks; and a tiering data movement engine, coupled to the block pinning engine and the storage device interface for relocating the data blocks to the storage media 1, the storage media 2, the storage media N, or the combination thereof within the virtual storage device 1 when the pinning status indicates unpinned.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The present invention provides a real-time method for detecting and locking frequently accessed data to storage media either on a permanent or time restricted basis that does not access the file system or reduce system performance. The present invention also provides a real-time system to perform its tasks without the need for user intervention to prioritize specific files. Given the dynamic nature of modern multi-threaded operating systems, a method is also provided to consistently refresh such pinned data to ensure the storage system is consistently pinning the most frequently accessed data without user intervention.

The term "tier" referred to herein is a type, group, array, or a combination thereof of storage media devices that have a similar performance characteristic. The term "performance characteristic" referred to herein is an indication of data handling capability that can include any device operation and interface timing. Examples of the performance characteristic can include access time, data through-put, interface bandwidth, input-output operations per second (IOPS), endurance, data density, data reliability, and duration of retention of the data. The numerical value of a tier of storage, such as tier zero storage, tier one storage, or tier two storage, can be indicative of its relative performance with tier zero storage being the highest performance and tier two being the lower performance. The tier zero storage can be formed of an array of a high-performance storage device, capable of more than 1000 IOPS, while the tier one storage can be formed of an array of a lower performance storage device capable of less than 200 IOPS.

The term "storage media device" referred to herein is an apparatus, system, or a combination thereof used for archiving and accessing of data in a computer system environment. The storage media device can include processing capability and can also include as well as execute software, firmware, or a combination thereof. For example, the storage media device can be a magnetic disk drive, a solid state disk drive, an optical disk drive, magnetic tape drive, or the like without regard to the interface attachment used. The term "rigidity" referred to herein is an indication that user data, associated with the operating system or applications, is pinned to a specific physical block address range for a set time. The term "pin, pinned, or pinning" referred to herein is the process of locking data blocks associated with a logical block address (LBA) range in a physical block address range in a high-performance storage device that enhances accesses and execution of the files commensurate with their priority within the storage system.

The term "real-time" referred to herein is an action to manage priority of data blocks and their location that is performed during the execution of a storage command accessing those same data blocks. The term "virtual storage" referred to herein is the total addressable storage available to a computer system that is actually composed of one or more storage devices, each of which represents a portion of the total addressable storage available to the computer system. The virtual storage is addressed by a virtual address that is translated to a physical address within the one or more storage devices. The term "engine" referred to herein is a specialized hardware structure that can be supported by software or microcode, configured to perform a specific function.

The term "module" referred to herein can include software supported by a specialized hardware in an embodiment of the present invention in accordance with the context in which the term is used. For example, the software can be machine code, firmware, embedded code, and application software. Also, for example, the hardware can be circuitry, processor, computer, integrated circuit, integrated circuit cores, a pressure sensor, an inertial sensor, a microelectromechanical system (MEMS), passive devices, or a combination thereof.

Figure 1:
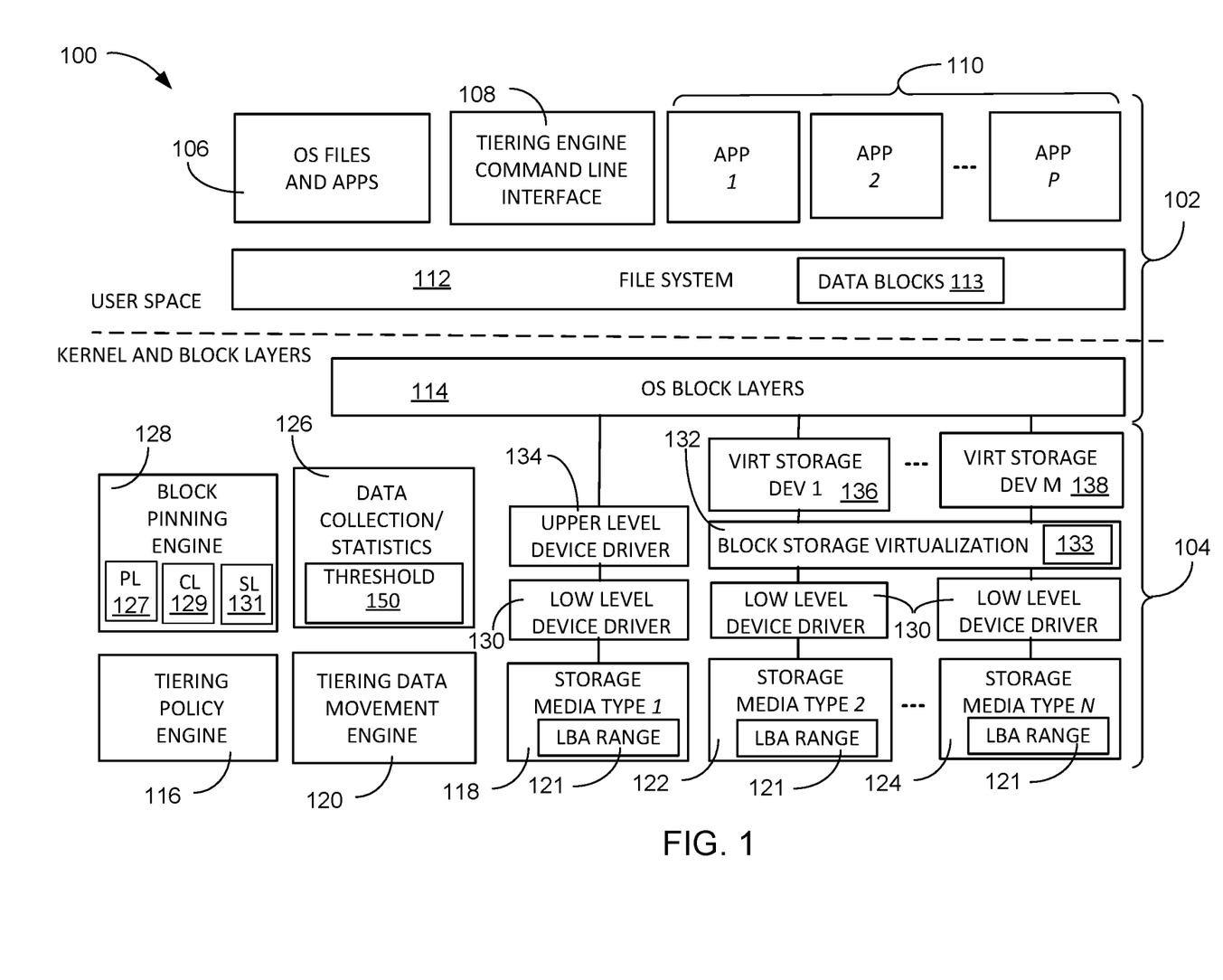
FIG. 1 is an architectural block diagram of a storage system with file priority mechanism in an embodiment of the present invention.

Referring now to FIG. 1, therein is shown a control flow block diagram of a storage system 100 with file priority mechanism in an embodiment of the present invention. The block diagram of the storage system 100 depicts a host processor 102 coupled to a storage processor 104. The host processor 102 can be a multi-processor, computer hardware, or embedded processor configured to execute operating system files and applications 106, a tiering engine command line interface module 108, user applications 110, a file system 112, and an operating system block layer module 114. The file system 112 manages the location and current version of data blocks 113 that are to be stored by the storage processor 104. The operating system block layer module 114 can support presentation of virtual storage devices or physical block storage devices and conveys the data blocks 113 between the host processor 102 and the storage processor 104.

The storage system 100 can be implemented as instructions on a non-transitory computer readable medium (not shown) to be executed by the host processor 102. The non-transitory computer readable medium can include non-volatile memory, such as a hard disk drive, non-volatile random-access memory (NVRAM), solid-state storage device (SSD), compact disk (CD), digital video disk (DVD), or universal serial bus (USB) flash memory devices. The non-transitory computer readable medium can be integrated as a part of the system or installed as a removable portion of the system. The storage system 100 can be implemented as a combination of flexible or dedicated hardware executing the instructions from the non-transitory computer readable medium or it can be implemented from dedicated hardware engines.

The operating system files and applications 106 can be system execution files and application core software that reside in the system memory of the host processor 102. The operating system files and applications 106 can provide the multi-threaded environment for managing the execution of the user applications 110. It is understood that the system memory within the host processor 102 can provide the temporary storage for the execution of the operating system files and applications 106, the tiering engine command line interface module 108, and the user applications 110.

The tiering engine command line interface module 108 can be a module that provides a user interface to a tiering policy engine 116 in the storage processor 104. The tiering engine command line interface module 108 can also provide notifications from the storage processor 104 to the host processor 102. The tiering engine command line interface module 108 can be used to establish the operating parameters within the tiering policy engine 116 for managing file priority among the operating system files and applications 106 and the user applications 110. The tiering engine command line interface module 108 can also provide a communication path from the storage processor 104 to alert the host processor 102 that the number of the data blocks 113 has exceeded a threshold 150, such as 80% of the available ones of logical block address (LBA) ranges 121, have been pinned to the LBA ranges 121. The threshold 150 can be initialized to a first value and can be adjusted as the storage system 100 is utilized. It would be understood that the operating system files and applications 106 can include files that are frequently executed and carry a higher priority than files that are seldom executed. The operating system files and applications 106 files, having the higher priority, can be pinned to a logical block address range that is within a storage media 1 118, such as expensive storage media including a solid state storage device (SSD), 10000-15000 RPM hard disk drive (HDD), or the like.

The tiering policy engine 116 can be a hardware structure, executing software or machine code, that provides criteria to a tiering data movement engine 120 for moving the data blocks 113 between the storage media 1 118, a storage media 2 122, a storage media N 124, or a combination thereof based on the frequency that the data blocks 113 are accessed. The tiering data movement engine 120 can be a hardware structure, executing software or machine code, that performs the movement of data between the storage media 1 118, the storage media 2 122, the storage media N 124, or a combination thereof based on input from the tiering policy engine 116, a data collection and statistics engine 126, and a block pinning engine 128. The storage media 2 122 can include a 7200 RMP HDD, a lower performance SSD, or the like. The storage media N 124 can include a 3600 RPM HDD, an optical disk storage device, a magnetic tape drive, or the like. It is understood that the types of storage devices listed above are an example only and are not intended to limit the invention. The tiering data movement engine 120 can be implemented as a processor, a processor core, a sequential state machine, or combinational logic for moving the data blocks 113 among the storage media 1 118, the storage media 2 122, and the storage media N 124 based on the control of the tiering policy engine 116.

The data collection and statistics engine 126 can be a hardware structure, executing software or machine code, that is configured to monitor accesses of the data blocks 113 stored in the storage media 1 118, the storage media 2 122, the storage media N 124, or a combination thereof to determine a current value of the file priority. The data collection and statistics engine 126 can provide guidance to the tiering data movement engine 120 based on accesses by the host processor 102 to establish a current value of the file priority. The block pinning engine 128 can be a hardware structure, executing software or machine code, that asserts a hold or lock on certain of the data blocks 113 stored in the storage media 1 118, the storage media 2 122, the storage media N 124, or a combination thereof, to prevent the data blocks from being moved to a different tier. Pinning can take the form of pinning status that is stored as part virtual mapping tables 133 in a block storage virtualization module 132, independently as a standalone table as well as a component of a metadata structure (not shown) on one or more of the storage media 1 118, the storage media 2 122, or the storage media N 124 for persistency through power loss and reboots.

The block pinning engine 128 can be a hardware structure, executing software or machine code, that communicates with the tiering policy engine 116 and the tiering data movement engine 120 to indicate that specific of the data blocks 113 are to be held or locked to the physical range of that provides the appropriate performance for the priority of the data blocks 113. The block pinning engine 128 can establish a permanent lock (PL) 127, a conditional lock (CL) 129, such as a time-based lock, or a sequence-based lock (SL) 131, based on the parameters from the tiering engine command line interface module 108 and priorities established by the host processor 102. The permanent lock 127 can perpetually hold the data blocks 113 in the physical block addresses of a fast storage device or a slow storage device.

A low-level device driver 130 can interface between the block storage virtualization module 132, an upper level driver 134, the storage media 1 118, the storage media 2 122, the storage media N 124, or a combination thereof. The low-level device driver 130 can be software that performs a translation of commands from the host processor 102 to be compatible with native commands of the storage media 1 118, the storage media 2 122, the storage media N 124, or a combination thereof. The block storage virtualization module 132 can be a module that translates or maps virtual logical block addresses (LBAs) into physical block addresses whose mapping can be modified based on policy or other parameters.

The block storage virtualization module 132 can include the virtual mapping tables 133 that can include a current physical address, an LBA locking tag, and the virtual address of the data blocks 113. The storage processor 104 can provide a virtual storage device 1 136 through a virtual storage device M 138. The virtual storage device 1 136 through the virtual storage device M 138 can be an accessible storage capacity that includes portions of the storage media 1 118, the storage media 2 122, the storage media N 124, or a combination thereof to meet the performance requirements of the host processor 102. It is understood that as the priorities of the host processor 102 change over time, the storage processor 104 can adjust the ratios of the storage media 1 118, the storage media 2 122, and the storage media N 124 that compose the virtual storage device 1 136 through the virtual storage device M 138, without user intervention, as the priorities of the host processor 102 change.

While the host processor 102 executes the operating system files and applications 106 and the user applications 110, it is unaware that the storage processor 104 can manage the storage location of the data blocks 113 in order to provide the best possible performance for the storage system 100. The block pinning engine 128 can provide permanent pinning of the data blocks 113 to a physical location within the storage media 1 118, the storage media 2 122, the storage media N 124, or a combination thereof, or a conditional pinning of the data blocks 113 based on time or accesses monitored by the data collection/statistics engine 126. Once a conditional pinning has expired, the tiering policy engine 116 and the tiering data movement engine 120 can relocate the data blocks 113, that were unpinned from the conditional pinning, to one of the storage media 1 118, the storage media 2 122, the storage media N 124, commensurate with the demand for the data blocks 113 tracked by the data collection/statistics engine 126.

By way of an example, the data blocks 113 associated with the operating system files and applications 106 can be permanently pinned to the storage media 1 118 in order to provide the best system performance. The data blocks 113 associated with the user applications 110 can be conditionally pinned to any of the storage media 1 118, the storage media 2 122, the storage media N 124, in order to assure the user applications 110 can achieve their best performance. The conditional pinning of the data blocks 113 can be unpinned to the tiering policy engine 116 that can then be allowed to relocate the data blocks 113. The conditional pinning of the data blocks 113 can be based on a time delay or a specific access sequence of the data blocks 113.

During system set-up, the tiering engine command line interface module 108 can be configured in a learning mode whereas the data blocks 113 accessed in the LBA ranges 121 by the user applications 110 or the operating system within a specific time frame are automatically pinned to the highest performance storage device available. The learning mode can be configured from the tiering engine command line interface module 108 or configured by the tiering policy engine 116 automatically during normal operation or following a system reboot.

During operation of the storage system 100, the block pinning engine 128 can enter the learning mode, which for a fixed period of time can pin the data blocks 113, both operating system files and user data files, to the fastest available of the storage media 1 118, the storage media 2 122, or the storage media N 124. During the learning mode, the data collection/statistics engine 126 can monitor all accesses to the data blocks 113. Based on the access history of each of the data blocks 113 during the learning mode, the block pinning engine 128 can permanently pin the data blocks 113, conditionally pin the data blocks 113, or unpin the data blocks 113 to the tiering policy engine 116 for relocation to an appropriate tier.

When the block pinning engine 128 pins the data blocks 113, either permanently or conditionally, to a specific one of the storage media 1 118, the storage media 2 122, or the storage media N 124, the data blocks 113 will remain locked to their current location within the tier. The block pinning engine 128 can maintain a pin status and priority tag in the virtual mapping table 133. If the block pinning engine 128 provides a conditional pinning of the data blocks 113, either a set time will be decremented to unpin the data blocks 113 or a specific sequence of access types can unpin the data blocks 113. Once the pinning of the data blocks 113 is terminated, the tiering policy engine 116 can manage the movement of the data blocks 113 based on an access history compiled by the data collection/statistics engine 126.

By way of an example, one of the data blocks 113 can be repeatedly written as the host processor 102 executes the operating system files and applications 106. In this situation, the data blocks 113 can be permanently pinned to the storage media 2 122, such as a hard disk drive (HDD) that is not impacted by multiple writes of the data blocks 113 as opposed to an expensive SSD that can quickly be worn out by excessive writing. One of the data blocks 113 that is conditionally pinned to the LBA range 121 will remain in its current location until the conditional pinning has lapsed, due to time-out or sequential unpinning, at which time the tiering policy engine 116 can take control of the data blocks 113 that should be managed by their access history from the data collection/statistics engine 126. The host processor 102 is not involved in the pinning of the data blocks 113 or the movement between tiers by the tiered data movement engine 120.

It has been discovered that the storage system 100 can improve the performance of the host processor 102 and computers in general, because the storage processor 104 can determine the LBA ranges 121, within each of the storage media 1 118, the storage media 2 122, and the storage media N 124, that can be permanently pinned or conditionally pinned in order to improve the performance of the host processor 102 without user intervention. The amount and cost of the storage media 1 118, such as expensive storage media like high performance SSD, to support the operating system and application environment is significantly reduced and the user experience is significantly improved through smoother and more consistent operation of the host processor 102. The storage processor 104 can autonomously pin higher priority files to a specific one of the LBA range 121 or a specific one of the storage media 1 118, the storage media 2 122, or the storage media N 124 in order to improve the performance of the storage system 100. Pinning of the data blocks 113 at block level provides a more efficient method to control locking of specific ones of the LBA ranges 121 in real-time, without having to access the host side file system tables or impact file IO performance by using scheduled operations.

It has also been discovered that unlike file pinning to specific storage tiers that have been attempted in a number of computer systems over many years, the storage system 100 does not rely on accesses to file system tables, because that implementation can interfere with normal file operation. In today's rapidly changing environment, deferred optimization is often too late as such decisions now need to be made in near real-time. The storage system 100 can autonomously maintain the peak performance of the host processor 102 while initially pinning the data blocks 113 to the fastest available of the storage media 1 118, the storage media 2 122, or the storage media N 124 for an initial learning mode and subsequently managed by the tiering policy engine 116 and the tiering data movement engine 120 to maintain the performance of the host processor 102.

Figure 2:
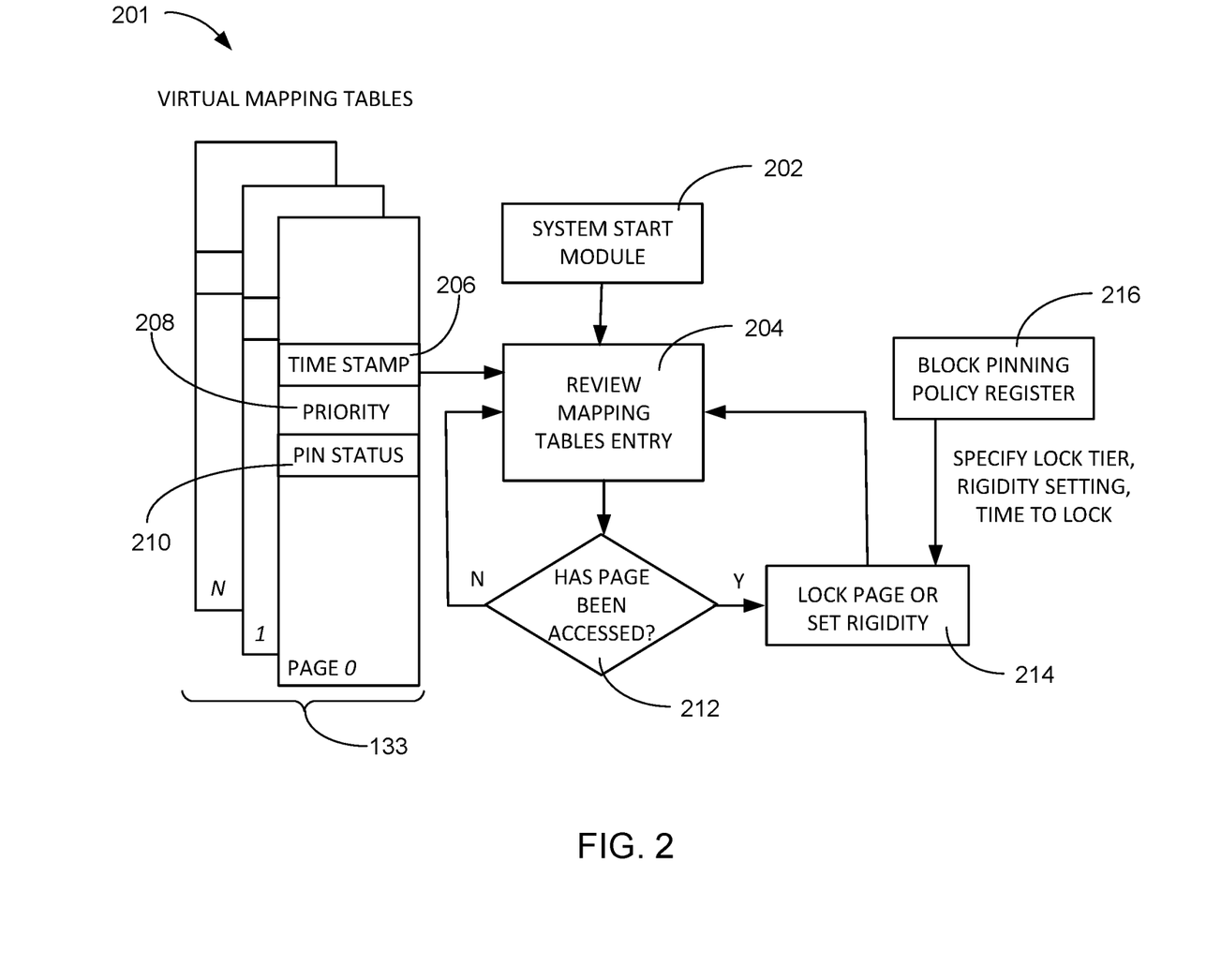
FIG. 2 is an architectural block flow diagram of a block level pinning set-up of the storage system of FIG. 1.

Referring now to FIG. 2, therein is shown an architectural block flow diagram of a block level pinning set-up 201 of the storage system 100 of FIG. 1. The architectural block flow diagram of the block level pinning set-up 201 of the storage system 100 depicts a system start module 202, in which the host processor 102 of FIG. 1 and the storage processor 104 of FIG. 1 are just released from a reset state to begin execution of the operating system files and applications 106 of FIG. 1. The system start module 202 can also be entered by a statistics table reset issued from within the storage processor 104.

The block level pinning set-up 201 then proceeds to a review mapping tables entry 204. The review mapping tables entry 204 can examine the virtual mapping tables 133 for a time stamp 206, indicating when the last access of the LBA range 121 occurred, a file priority 208, indicating the relative priority of the data blocks 113, and a pin status 210, indicating a permanent lock 127, a conditional lock 129, a sequence lock 131, or free to relocate, indicated by a lack of the pin status 210. The pin status 210 can also indicate the type of conditional lock is in place. A time-based conditional pinning can also provide the time remaining to unpin the data blocks 113 in a specific one of the LBA ranges 121. A sequence based conditional pinning or sequence lock 131 can indicate the remaining steps/operations required to unpin the data blocks 113.

The file priority 208 can reflect the frequency that the data is utilized by the host processor 102. By way of an example, the operating system files and applications 106 are the primary execution path for the host processor 102 and carries the highest value of the file priority 208 due to the frequent accesses. The execution of the user applications 110 can have a mixed value of the file priority 208. Some of the user applications 110 can be database management applications, which can infrequently read large amounts of the data blocks 113 and as such can have a lower value of the file priority 208 than an interactive application that can frequently read or write the data blocks 113. An archival application can have a low value of the file priority 208. The host processor 102 can influence the file priority 208 based on the type of the user applications 110 that are accessed.

The block level pinning set-up 201 then proceeds to a has page been accessed 212 to determine whether the LBA range 121 identified in the selected page of the virtual mapping tables 133 has been accessed by the file system 112 of FIG. 1. If the data blocks 113 in the LBA range 121 have not been accessed, the flow returns to the review mapping tables entry 204 to examine the next one of the virtual mapping tables 133. If however, the data blocks 113 in the LBA range 121 have been accessed, the flow proceeds to a lock or set rigidity module 214. The lock or set rigidity module 214 can access the pin status 210 in order to determine whether the data blocks 113 are permanently locked, conditionally locked, or free to relocate. The lock or set rigidity module 214 can receive input from a block pinning policy register 216 to determine what action can be performed with the data blocks 113. The block pinning policy register 216 can be a hardware register that is loaded with the pin status 210 from the virtual mapping tables 133.

By way of an example, if the pin status 210 indicates that a conditional lock has just timed-out, the lock or set rigidity module 214 can flag the data blocks 113, in that specific ones of the LBA range 121, as free to relocate. This will allow the tiering data movement engine 120 of FIG. 1 to relocate the data blocks 113 to an appropriate one of the storage media 1 118 of FIG. 1, the storage media 2 122 of FIG. 1, or the storage media N 124 of FIG. 1 to match the file priority 208 and the statistics from the data collection/statistics engine 126 of FIG. 1.

The block level pinning set-up 201 then proceeds to the review mapping tables entry 204 to analyze the next entry in the virtual mapping tables 133. It is understood that the block level pinning set-up 201 can occur after a system boot-up or as a result of a statistics table reset issued from within the storage processor 104.

It has been discovered that the storage system 100 can improve the performance of the host processor 102 of FIG. 1 by maintaining high priority files in the fastest of the LBA ranges 121 that are available at the time the data blocks 113 are written. The data blocks 113 can be conditionally pinned to the LBA ranges 212 that match the priority 208 of the data blocks 113. As the host processor 102 completes the user applications 110 of FIG. 1, the conditional pinning of the data blocks 113 can be unpinned to be relocated by the tiered data movement engine 120 of FIG. 1. As the host processor 102 initiates an additional one of the user applications 110, the new ones of the user applications 110 can provide a higher number in the priority 208 to indicate the pin status 210 of the new ones of the data blocks 113.

Figure 3:
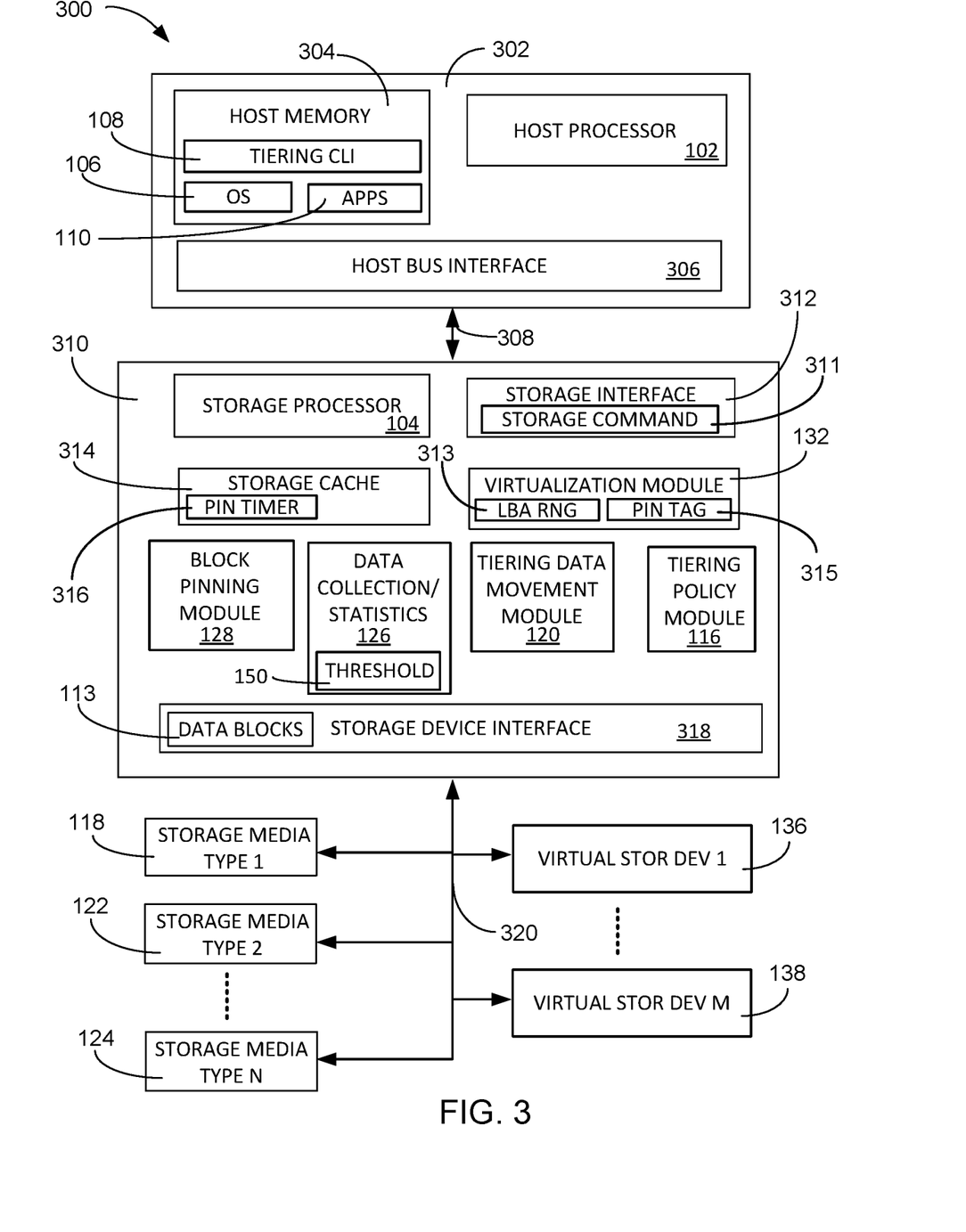
FIG. 3 is an architectural block diagram of a storage system with file priority mechanism in a further embodiment of the present invention.

Referring now to FIG. 3, therein is shown an architectural block diagram of a storage system 300 with file priority mechanism in an embodiment of the present invention. The architectural block diagram of the storage system 300 depicts a host computer 302 including the host processor 102, a host memory 304 and a host bus interface 306. A system interface bus 308 can couple the host computer to a storage controller 310. The system interface bus 308 can be a hardware communication structure, such as a parallel bus, a serial bus, an electronic connection, an optical connection, or a wireless connection between the host computer 302 and the storage controller 310.

The storage controller 310 can be a hardware structure supported by software that can be executed by the storage processor 104. A storage command 311 can be transferred from the host computer 302 to a storage controller interface 312. The storage controller interface 312 can be a hardware connection point for the system interface bus 308 and represents the communication path for commands and data transferred between the host computer 302 and the storage controller 310. A storage cache 314, such as a volatile memory, can provide a temporary holding area for commands and data transferred across the system interface bus 308. The storage cache 314 can also provide a temporary work space for the data collection/statistics engine 126, the block pinning engine 128, the tiering policy engine 116, and the tiering data movement engine 120. The storage cache 314 can also provide a pin timer 316 that is used by the storage processor 104 to monitor a learning mode right after system start-up or return from reset. The pin timer 316 can be a segment of memory in the storage cache 314 that can be decremented by a background operation of the storage processor 104.

The block storage virtualization module 132 can receive commands from the host computer 302 that can indicate a specific value for an LBA range 313 to store the data blocks 113 of FIG. 1 the pin tag 315 can be stored as file priority 208 of FIG. 2 including a pinning condition code, such as permanent pinning, conditional pinning based on time or sequence, or free to relocate. This information can be used by the block pinning engine 128 to determine what type of file pinning is appropriate for the data blocks 113 of FIG. 1 that will be transferred after the host command is accepted. By way of an example, the data blocks 113 that carry a low value of the file priority 208 can be permanently pinned to the storage media N 124 of FIG. 1 providing the least expensive and slowest storage. In contrast, the operating system files and applications 106 of FIG. 1 can have the highest value of the file priority 208 and can be permanently pinned to the storage media 1 118 of FIG. 1 for quick access.

The user applications 110 of FIG. 1 can have a middle value of the file priority 208 and as such can be conditionally pinned to the storage media 1 118 or the storage media 2 122 of FIG. 1. The conditional pinning of the data blocks 113 can be time based or sequence based. As an example, the user application 110 can have a period of intense activity followed by long periods of number crunching that does not involve the storage controller 310, a transition sequence can be detected to unpin the data blocks 113 and allow the tiering policy engine 116 to determine the appropriate one of the storage media 1 118, the storage media 2 122, the storage media N 124, or the combination thereof, based on the input from the data collection/statistics engine 126. The data collection/statistics engine 126 can monitor the threshold 150 in order to detect when an excessive number of the LBA's have been pinned to one of the storage media 1 118, the storage media 2 122, the storage media N 124, or the combination thereof.

A storage device interface 318 can be a hardware structure that provides communication between the storage controller 310 and the storage media 1 118, the storage media 2 122, the storage media N 124. The storage controller 310 can present the virtual storage device 1 136 through the virtual storage device M 138 to the host computer 302. The virtual storage device 1 136 through the virtual storage device M 138 can each be comprised of portions of the storage media 1 118, the storage media 2 122, the storage media N 124. A storage bus 320 can couple the storage device interface 310 to the storage media 1 118, the storage media 2 122, the storage media N 124.

The storage bus 320 can be a fiber-optic channel (FC), a serial attached small computer system interface (SAS), serial advanced technology attachment (SATA), non-volatile memory express (NVMe), or the like. It is understood that the virtual storage device 1 136 through the virtual storage device M 138 are virtual representations of portions of the storage media 1 118, the storage media 2 122, the storage media N 124 partitioned to support the virtual storage device 1 136 through the virtual storage device M 138. As such, the storage processor 104 can adjust the ratios of the storage media 1 118, the storage media 2 122, the storage media N 124, without user intervention, as required to meet the performance requirements of the host computer 302.

It is understood that the tiering data movement engine 120 can relocate the data blocks 113, but can also change the portions of the storage media 1 118, the storage media 2 122, the storage media N 124 that make-up the virtual storage device 1 136. By changing the portions of the storage media 1 118, the storage media 2 122, the storage media N 124, the virtual storage device 1 136 can accommodate more of the pinned data blocks 113 without requiring the host computer to be involved with the change. The overall capacity of the virtual storage device 1 136 would remain the same.

It has been discovered that the storage system 300 can improve data flow efficiency for the host computer 302 by pinning of the data blocks 113 to a specific set of the LBA ranges 121 from system boot-up through full system operation. As the priorities of the host computer 302 changes, the storage processor 104 can adjust the pinning strategy to maintain the fastest performance possible. As the conditional pinning hits the time-out the data blocks 113 can be unpinned and the tiering policy engine 116 can take-over maintaining the appropriate performance level of the data blocks 113 by relocating them to the storage media 1 118, the storage media 2 122, the storage media N 124 appropriate for the best performance of the host computer 302.

Figure 4:
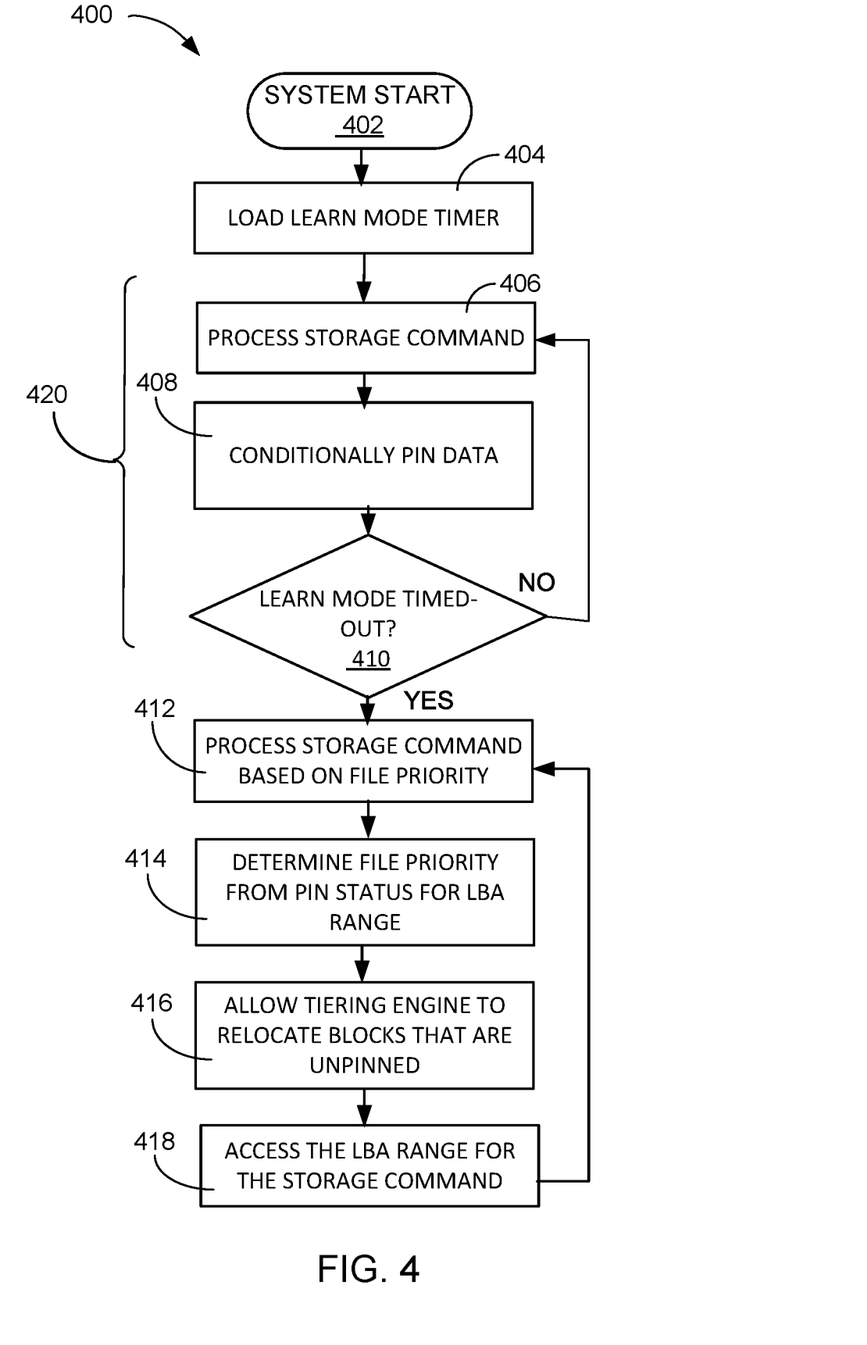
FIG. 4 is a flow chart of a method of operation of the storage system with file priority mechanism in an embodiment of the present invention.

Referring now to FIG. 4, therein is shown a flow chart of a method 400 of operation of the storage system 300 with file priority mechanism in an embodiment of the present invention. The flow chart of the method 400 depicts a system start 402, in which the host computer 302 of FIG. 3 has just powered-on or returned from a system reset operation.

The flow proceeds to a load learning mode timer 404, in which the storage processor 104 can retrieve the pinning tag 315 of FIG. 3 associated with the LBA range 313 of FIG. 3 from the virtual mapping tables 133 of FIG. 1. The pin timer 316 can be established in the storage cache 314 of FIG. 3, in order to bound the learning mode operations 420. The flow proceeds to a process storage command 406, in which the storage command 311 of FIG. 3 is interpreted by the storage processor 104 of FIG. 3 to set the pinning tag 315 for a conditional pinning while the learning mode is in effect. The flow proceeds to a conditionally pin data 408. During the learning mode operations 420, any of the storage command 311 of FIG. 3 can conditionally pin the data blocks 113 to the LBA range 313 that provides the best performance for the host computer 302.

The flow proceeds to a learn mode timed-out? 410, in which the state of the learning mode is determined. If the learning mode has not timed-out the flow returns to the process storage command 406 to handle the next one of the storage command 311. If the learning mode has timed-out, the flow proceeds to a process storage commands based on file priority 412. During the learning mode operations 420, the storage processor 104 can identify the priority of the data blocks 113 of FIG. 1 based on the frequency of access, whether the data blocks 113 are read or written, the type of the media that they are stored in, or a combination thereof.

The flow proceeds to a determine file priority 414, in which the storage processor 104 can check the pinning tag 315 for the LBA range 313 associated with the storage command 311. The storage processor 104 can update the pinning tag 315 associated with the LBA range 313. An LBA range 313 that was conditionally pinned to a high performance storage media 1 118 in the learning mode operations 420 and not again accessed, can be moved to an archive media, including the storage media N 124, by the tiering data movement engine 120 of FIG. 3. The flow proceeds to an allow tiering engine to relocate blocks that are unpinned 416. The tiering data movement engine 120 can move the data blocks 113 associated with an LBA range 313 to a new physical address by moving the data blocks 113 and updating the virtual mapping tables 133 of FIG. 1 with a new value of the priority 208 of FIG. 2, the time stamp 206 of FIG. 2, and the pin status 210 of FIG. 2. By way of an example, the data blocks 113 that were initially stored with a high priority, then seldom accessed, can be relocated to a slower one of the storage media 2 122 through the storage media N 124 and have the pinning tag 315 set to free to relocate. This will allow the tiering policy engine 116 of FIG. 1 and the tiering data movement engine 120 of FIG. 1 the ability to relocate the data blocks 113 based on their use by the host computer 302.

The flow proceeds to an access the LBA range for the storage command 418. The data collection/statistics engine 126 can update the time stamp 206, the priority 208, and the pin status 210. Any of the data blocks 113 that were written with high priority during the learning mode operations 420 and subsequently frequently accessed will maintain the high priority based on the history from the data collection/statistics engine 126. Any of the data blocks 113 that have been unpinned from the pinning tag 315 will be managed by the tiering policy engine 116 of FIG. 1 and the tiering data movement engine 120. Any of the data blocks 113 that are permanently pinned or conditionally pinned by the pinning tag 315, will remain locked in the LBA range 315 until the pinning tag 315 is unpinned.

It has been discovered that the method 400 of operation of the storage system 300 can provide the enhanced performance of the host processor 302 by maintaining the most used of the data blocks 113 in the best performing of the storage media 1 118 of FIG. 1, the storage media 2 122 of FIG. 1, the storage media N 124 of FIG. 1, or a combination thereof. By providing the data blocks 113 as quickly as possible, from the best performing of the storage media 1 118, the storage media 2 122, the storage media N 124, or a combination thereof based on the learning mode operations 420 monitored by the data collection/statistics engine 126. Once the learning mode operations 420 are complete, the tiering policy engine 116 of FIG. 1 and the tiering data movement engine 120 of FIG. 1 can maintain the data blocks 113 in the LBA range 315 suitable for their priority 208.

Figure 5:
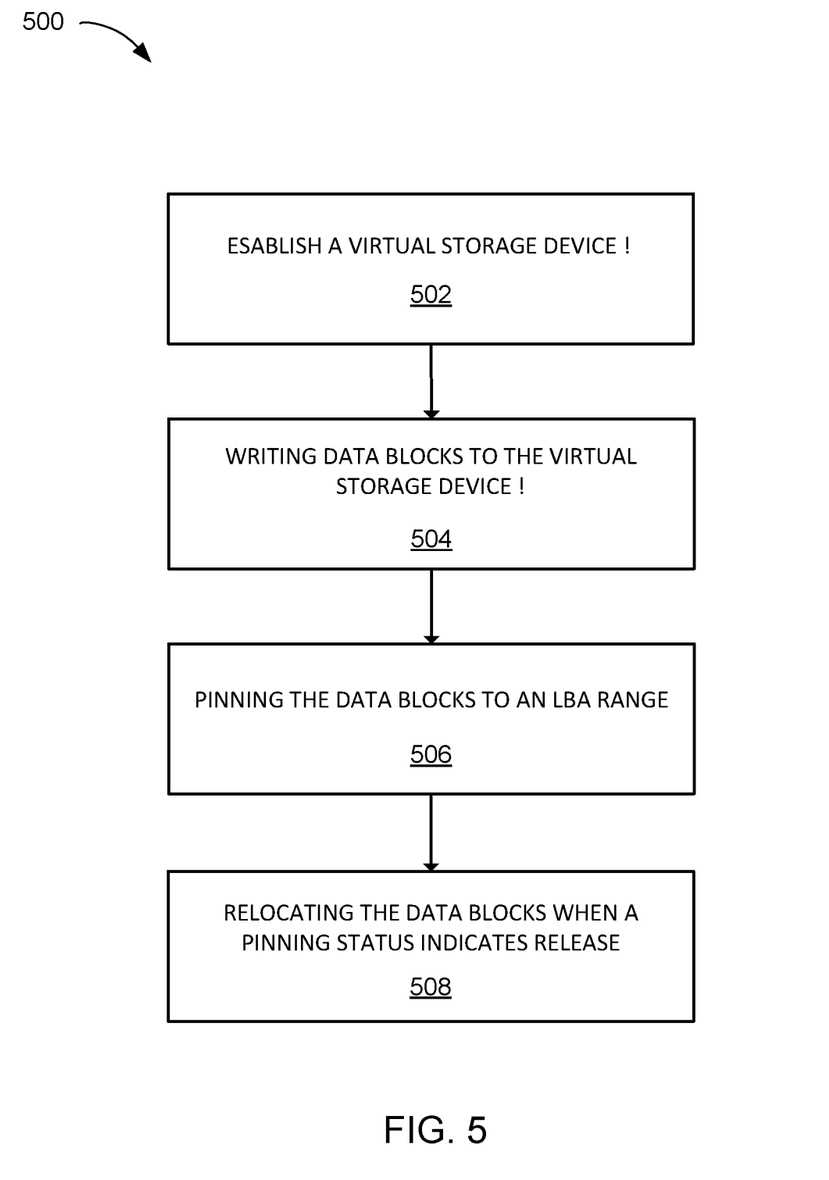
FIG. 5 is a flow chart of the method of operation of a storage system in an embodiment of the present invention.

Referring now to FIG. 5, therein is shown a flow chart of a method 500 of operation of a storage system 100 in an embodiment of the present invention. The method 500 includes: establishing a virtual storage device 1 including allocating portions of a storage media 1, a storage media 2, a storage media N, or a combination thereof in a block 502; writing data blocks to the virtual storage device 1 including establishing a pinning status for the data blocks in a block 504; pinning the data blocks to a logical block address (LBA) range until the pinning status indicates an unpinning of the data blocks in a block 506; and relocating the data blocks, by a tiering data movement engine, to the storage media 1, the storage media 2, the storage media N, or the combination thereof within the virtual storage device 1 when the pinning status indicates unpinned in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a storage system comprising:
   establishing a virtual storage device 1 including allocating portions of a storage media 1, a storage media 2, a storage media N, or a combination thereof including writing data blocks to the virtual storage device 1;
   determining a pinning status for the data blocks;
   pinning the data blocks to a logical block address (LBA) range until the pinning status indicates an unpinning of the data blocks including updating a tiering policy engine and reporting when over a threshold of available LBA ranges have been pinned; and
   relocating the data blocks to the storage media 1, the storage media 2, the storage media N, or the combination thereof within the virtual storage device 1 when the pinning status indicates unpinned.

2. The method as claimed in claim 1 wherein pinning the data blocks to the logical block address (LBA) range includes setting the pinning status to be a permanent lock of the data blocks to the LBA range.

3. The method as claimed in claim 1 wherein pinning the data blocks to the logical block address (LBA) range includes setting the pinning status to be a conditional lock based on a time stamp decremented to zero.

4. The method as claimed in claim 1 wherein pinning the data blocks to the logical block address (LBA) range includes setting a pinning status to be a conditional lock that can be unpinned by detecting a pre-defined sequence of accesses of the data blocks.

5. The method as claimed in claim 1 wherein relocating the data blocks includes monitoring learning mode operations of the data blocks by a data collection/statistics engine to establish a file priority.

6. The method as claimed in claim 1 further comprising collecting statistics for the LBA range including determining a file priority for establishing the pinning status.

7. The method as claimed in claim 1 wherein establishing the pinning status includes assigning a time-based conditional pinning status while the data blocks are accessed by learning mode operations.

8. The method as claimed in claim 1 further comprising accessing a time stamp, determining a file priority, and updating the pinning status in a virtual mapping table.

9. The method as claimed in claim 1 wherein relocating the data blocks includes determining a file priority by reading a virtual mapping table.

10. A storage system comprising:
    a storage media 1, a storage media 2, a storage media N, or a combination thereof allocated to a virtual storage device 1;
    a storage device interface, coupled to the virtual storage device 1, configured to write data blocks to the virtual storage device 1 including establishing a pinning status for the data blocks;
    a block pinning engine, coupled to the storage device interface, configured to update the pinning status and pin the data blocks to a logical block address (LBA) range until the pinning status indicates an unpinning of the data blocks includes access to a tiering command line interface, for updating the tiering policy engine and reporting when over a threshold of available LBA ranges have been pinned; and
    a tiering data movement engine, coupled to the block pinning engine and the storage device interface configured to relocate the data blocks to the storage media 1, the storage media 2, the storage media N, or the combination thereof within the virtual storage device 1 when the pinning status indicates unpinned.

11. The system as claimed in claim 10 wherein block pinning engine configured to pin the data blocks to the logical block address (LBA) range includes the pinning status set to be a permanent lock of the data blocks to the LBA range.

12. The system as claimed in claim 10 wherein the block pinning engine configured to pin the data blocks to the logical block address (LBA) range includes the pinning status set to be a conditional lock based on a time stamp decremented to zero.

13. The system as claimed in claim 10 wherein the block pinning engine configured to pin the data blocks to the logical block address (LBA) range includes a pinning status set to be a conditional lock that can be unpinned by detecting a specific sequence of accesses of the data blocks.

14. The system as claimed in claim 10 further comprising a data collection/statistics engine, coupled to the storage device interface, configured to monitor accesses of the data blocks and establish a file priority.

15. The system as claimed in claim 10 further comprising a data collection/statistics engine, coupled to the storage device interface, configured to collect statistics for the LBA range and determine a file priority for establishing the pinning status.

16. The system as claimed in claim 10 wherein the block pinning engine assigns a time-based conditional pinning status while the data blocks are initially accessed.

17. The system as claimed in claim 10 wherein the block pinning engine manages virtual mapping tables including accessing a time stamp, determining a file priority, and updating the pinning status.

18. The system as claimed in claim 10 further comprising a tiering data movement engine, coupled to the storage device interface, configured to determine a file priority by reading virtual mapping tables in order to relocate the data blocks.

* * * * *